March 6, 1951 V. C. WESTCOTT 2,544,407

ELECTRICAL CIRCUITS

Filed May 2, 1946

INVENTOR
VERNON C. WESTCOTT
BY Elmer J. Gorn
ATTY.

Patented Mar. 6, 1951

2,544,407

UNITED STATES PATENT OFFICE 2,544,407

ELECTRICAL CIRCUITS

Vernon C. Westcott, Lincoln, Mass., assignor to Raytheon Manufacturing Company, Newton, Mass., a corporation of Delaware Application May 2, 1946, Serial No. 666,588

1 Claim. (Cl. 250—36)

Figures 1, 2:
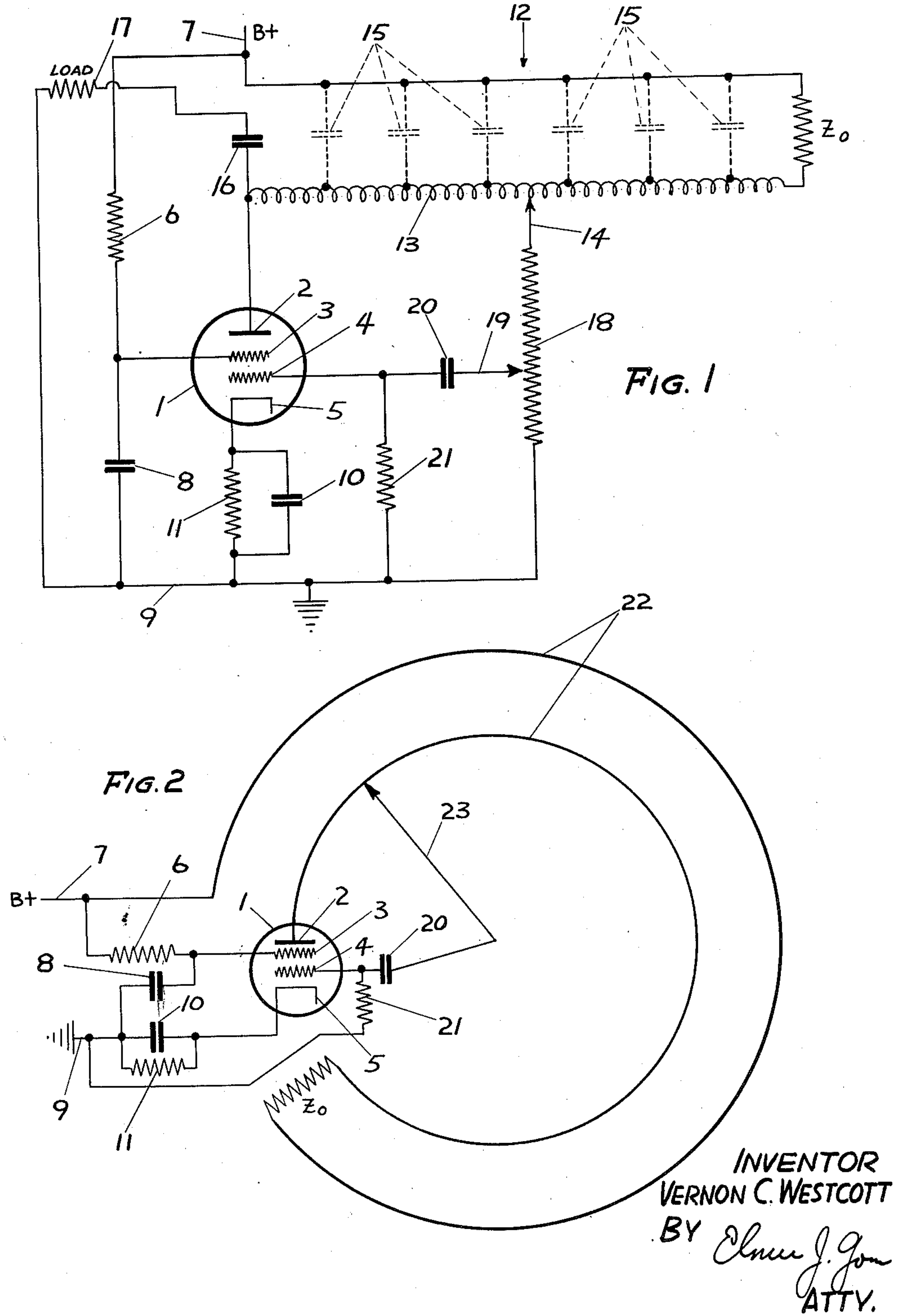

This invention relates to electrical circuits, and more particularly to an oscillator.

An object of this invention is to devise an oscillator having a very wide range of oscillation frequencies.

Another object is to devise an oscillating circuit which is capable of producing waves having various wave forms.

A further object is to devise an oscillator which can be used to emphasize selected harmonics of a certain frequency.

The foregoing and other objects of the invention will be best understood from the following description of an exemplification thereof, reference being had to the accompanying drawing, wherein:

Fig. 1 is a diagrammatic representation of one means for carrying out the invention; and Fig. 2 is a diagrammatic representation of another means for carrying out the invention.

Referring to Fig. 1, an electron discharge tube, for example a tetrode, is shown at 1, said tube having an anode 2, a screen grid 3, a control grid 4, and a cathode 5 which is heated to the temperature of thermionic emission by any suitable heating means (not shown). Screen grid 3 is connected through a resistor 6 to a positive B-supply lead 7, and is also connected through a condenser 8 to a grounded lead 9. Cathode 5 is connected through a self-biasing arrangement, comprising a condenser 10 and a resistor 11 in parallel, to lead 9. Anode or plate 2 is connected to B-supply lead 7 through an artificial tapped open coil transmission line 12. Line 12 consists of a series inductance 13 having a movable tap 14 thereon, and is so constructed as to provide distributed shunt capacitance 15 therealong. This line is terminated in its characteristic impedance $Z_0$, whereby reflections of waves traveling along said line are prevented. Plate 2 is connected, through a condenser 16, to one side of a load 17, the other side of said load being connected to the grounded lead 9.

Tap 14 is connected to one end of a resistor 18 having a movable tap 19 thereon, the other end of said resistor being connected to grounded lead 9. Tap 19 is connected through condenser 20 to control grid 4. Leak resistor 21 is connected from the grid side of condenser 20 to grounded lead 9.

In order for oscillations to be established in a tube circuit, it is essential that there be a phase shift of 360 degrees around the system, from the input to the output and back to the input again, and it is also essential that the gain around the system be at least equal to unity. If these two conditions be fulfilled, the system will oscillate at a frequency for which there is a phase shift of 360 degrees around the system, if the system gain for such a frequency is at least equal to unity. There is ordinarily a phase difference of 180 degrees between grid and plate voltages due to the inherent properties of an electron discharge tube, so that if an additional phase shift of 180 degrees can be imparted to a wave by the external system, the required 360 degree shift will be obtained.

Transmission or delay line 12, due to its inductance and capacitance, will impart a phase shift or phase delay to waves traveling down it. For any fixed position of tap 14, there is a certain frequency for which the phase delay between plate 2 and tap 14 will be exactly 180 degrees, and the circuit will oscillate at this certain frequency if the gain around the system is greater than unity. Another way of expressing this is, for any fixed position of tap 14, there is a certain frequency at which the time required for a wave to travel from the plate 2 to the tap 14 will be exactly equal to one-half cycle of this frequency, or 180 degrees, and the system will oscillate at this frequency. The frequency of oscillation of the system may be varied by moving tap 14, since for each different position of tap 14 there is a certain different frequency at which the proper phase relations for oscillation occur. Since it is possible to make the transmission line as long as desired, and since it is theoretically possible to bring tap 14 infinitely close to plate 2, a broad-band oscillator is provided by this invention. An enormous frequency range, such as, for example, from 30 kilocycles to 20 megacycles, may be obtained with a single oscillator and may be utilized in a load device 17 of any desired type.

As will be appreciated by those skilled in the art, the required 180 degree phase delay, for any fixed position of tap 14, exists for a certain fundamental frequency and for all odd harmonics of that fundamental. This affords a means whereby various different wave forms may be obtained, from pure sinusoidal to square waves. The transmission line attenuates the lower frequencies less than the higher frequencies, while the resistance 18 attenuates all frequencies equally. Therefore, by moving tap 19 on potentiometer 18 toward the grounded end thereof, the system gain may be made equal to unity for the fundamental frequency and less than unity for the odd harmonics, in which case the odd harmonics will not appear in the oscillator output and a pure sine wave will be produced. By moving tap 19 toward the transmission line end of potentiometer 18, the system gain may be made unity or greater for various odd harmonics, whereby these harmonics will also appear in the oscillator output and a distorted sine wave will be produced. The nearer tap 19 is to the transmission line end of potentiometer 18, the more harmonics will be mixed with the fundamental and the nearer to a square wave the oscillator output will be. Therefore, the wave form of the oscillator output may be varied, for any particular fundamental determined by the position of tap 14, by the adjustment of tap 19.

It is to be understood that a real transmission line may be used in place of an artificial transmission line, and that the term "transmission line" in the claim is meant to include such devices as wave guides, concentric lines, and lecher wire systems. In Fig. 2 is shown an example of the latter. In Fig. 2, parts similar to those of Fig. 1 have been given the same reference numerals. A lecher wire system, comprising a pair of wires 22 arranged in the form of a circle, connects anode 2 to B-supply lead 7. These two wires are connected together at one end by the characteristic impedance $Z_0$ of the line, while plate 2 is connected to the opposite end of one wire and lead 7 to the opposite end of the other. A sliding contact 23 is connected to control grid 4 through condenser 20, and engages the wire 22 which is connected to plate 2. In Fig. 2, the lecher wires are used to provide the phase delay, and the frequency of oscillation is varied by moving contact 23. In Fig. 2, a potentiometer arrangement similar to that of Fig. 1 may be used in the grid feedback connection. This has not been shown, in order to simplify the drawing.

If desired, in order to obtain low frequencies of output, the lecher wires may be "loaded" with a piece of iron near their $Z_0$ end, or the lecher wire system may be combined with a delay line of the type shown in Fig. 1, for example, both of these expedients being useful to obtain greater delay than that possible with a lecher wire system.

Of course, it is to be understood that this invention is not limited to the particular details as described above, as many equivalents will suggest themselves to those skilled in the art. It is accordingly desired that the appended claim be given a broad interpretation commensurate with the scope of this invention within the art.

What is claimed is:

An oscillatory circuit comprising: an electron discharge device having an anode, a cathode and a control electrode; a source of voltage having its negative terminal connected to said cathode; a transmission line, having a varying attenuation-frequency characteristic, terminated at one end in its characteristic impedance and provided along the length thereof with a first movable tap; the other end of said transmission line being connected between said anode and the positive terminal of said source of voltage; and a potentiometer connected at its ends, respectively, to the negative terminal of said source of voltage and to said first movable tap, and provided along the length thereof with a second movable tap; said second movable tap being connected to said control electrode.

VERNON C. WESTCOTT.

REFERENCES CITED

The following references are of record in the file of this patent:

UNITED STATES PATENTS

| Number | Name | Date |
|---|---|---|
| 1,945,544 | Conklin | Feb. 6, 1934 |
| 1,989,082 | Colton et al. | Jan. 29, 1935 |
| 2,212,173 | Wheeler et al. | Aug. 20, 1940 |
| 2,236,985 | Bartelink | Apr. 1, 1941 |
| 2,362,470 | De Rosa | Nov. 14, 1944 |
| 2,367,693 | Segerstrom, Jr. | Jan. 23, 1945 |
| 2,382,413 | Hanert | Aug. 14, 1945 |
| 2,404,399 | Pickles | July 23, 1946 |
| 2,413,182 | Hollingsworth et al. | Dec. 24, 1946 |